United States Patent [19]

Chang et al.

[11] Patent Number: 4,623,697
[45] Date of Patent: Nov. 18, 1986

[54] UNGELLED RESINS CONTAINING HYDROLYZABLE MOIETIES FROM ORGANOSILANE COMPOUNDS

[75] Inventors: Wen-Hsuan Chang; David T. McKeough, both of Gibsonia, Pa.

[73] Assignee: PPG Industries, Inc., Pittsburgh, Pa.

[21] Appl. No.: 728,966

[22] Filed: Apr. 30, 1985

[51] Int. Cl.$^4$ .............................................. C08F 8/00
[52] U.S. Cl. ........................................ 525/61; 525/403; 525/431; 525/446; 528/26; 528/27; 528/28; 528/29
[58] Field of Search ...................... 528/26, 27, 28, 29; 525/446, 403, 431, 61

[56] References Cited

U.S. PATENT DOCUMENTS

| | | | |
|---|---|---|---|
| 4,093,673 | 6/1978 | Chang et al. | 528/76 |
| 4,191,713 | 4/1980 | Yonezawa et al. | 525/102 |
| 4,243,767 | 1/1981 | Kaufman et al. | 525/102 |
| 4,368,294 | 1/1983 | Deubzer et al. | 525/100 |
| 4,399,261 | 8/1983 | Kato et al. | 525/342 |
| 4,413,086 | 11/1983 | Chang et al. | 525/28 |
| 4,446,292 | 5/1984 | Chang et al. | 528/29 |
| 4,467,081 | 8/1984 | Chang et al. | 528/26 |
| 4,472,465 | 9/1984 | Burrill | 427/387 |
| 4,501,872 | 2/1985 | Chang et al. | 528/18 |

FOREIGN PATENT DOCUMENTS 126470 7/1984 Japan .

Primary Examiner—Melvyn I. Marquis
Attorney, Agent, or Firm—Thomas M. Breininger

[57] ABSTRACT

Disclosed is an ungelled resin composition comprising a compound having at least one group containing a silicon atom selected from:

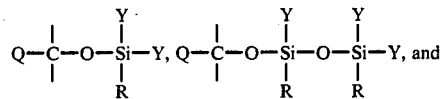
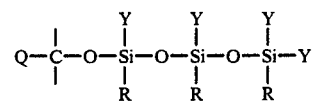

wherein

Q represents the residue from an organic polyol selected from the group consisting of (1) simple diols, triols and higher hydric alcohols, (2) polyester polyols, (3) polyether polyols, (4) amide-containing polyols, (5) epoxy polyols and (6) polyhydric polyvinyl alcohols, and each R independently is selected from the group of moieties consisting of hydrogen, and a $C_1$–$C_{10}$ group joined to Si through an Si-C linkage, and Y represents an easily hydrolyzable group.

The ungelled resin composition contains an amount of easily hydrolyzable Y moieties directly bonded to silicon atoms such that the ratio of the number of grams of the ungelled resin composition to equivalents of easily hydrolyzable Y moieties in the ungelled resin composition is in a range of from 40 to 667. Preferred resin compositions of the invention can be cured in the presence of atmospheric moisture and a suitable catalyst at a temperature of less than or equal to 121 degrees Celsius within 3 hours.

Disclosed is a method for producing the ungelled resin composition.

Also disclosed is a nonaqueous composition, particularly a nonaqueous coating composition, containing an ungelled resin composition of the invention. Preferred coating compositions containing an ungelled resin composition of the invention can be cured in the presence of atmospheric moisture and a suitable catalyst at a temperature of less than or equal to 121 degrees C within 3 hours.

28 Claims, No Drawings

UNGELLED RESINS CONTAINING HYDROLYZABLE MOIETIES FROM ORGANOSILANE COMPOUNDS

BACKGROUND OF THE INVENTION

1. Field of Invention

This invention is directed to curable ungelled resins and to compositions, particularly coating compositions, containing curable ungelled resins which compositions cure at low temperature, preferably ambient temperature, in the presence of moisture.

2. Some Objects of the Present Invention

There is continuing need, particularly in the coatings industry, to provide compositions which have low curing temperatures and, preferably, which cure at ambient temperature. There is also a continuing need to provide compositions which contain ever lower concentrations of volatile organic components. Additionally, it would be desirable to provide compositions which do not depend on organic isocyanates for curing.

However, previous approaches to meet these challenges generally have involved disadvantageous compromises among desirable coating compositions properties such as molecular weight of the principal film forming resin, application viscosity of the composition, low curing temperature, and desirable properties of the cured film such as water resistance, flexibility, hardness, solvent resistance, etc.

Objects of the present invention are to help meet these challenges. Additionally, an object of the present invention is to prepare new curing agents for organic polyols. Other objects of the invention will become apparent to the reader infra.

SUMMARY OF THE INVENTION

The present invention is for an ungelled resin composition comprising a compound having at least one group containing a silicon atom, the aforesaid group being independently selected from:

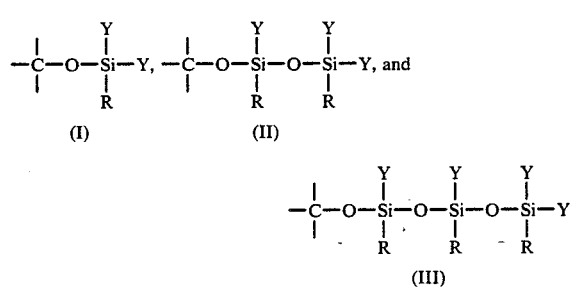

wherein

Q represents the residue from an organic polyol selected from the group consisting of (1) simple diols, triols and higher hydric alcohols, (2) polyester polyols, (3) polyether polyols, (4) amide-containing polyols, (5) epoxy polyols and (6) polyhydric polyvinyl alcohols, and each R independently is selected from the group of moieties consisting of hydrogen, and a $C_1$-$C_{10}$ group joined to Si through an Si—C linkage, and Y represents an easily hydrolyzable group;

provided that said ungelled resin composition contains an amount of easily hydrolyzable Y moieties directly bonded to silicon atoms such that the ratio of the number of grams of said ungelled resin composition to equivalents of easily hydrolyzable Y moieties in said ungelled resin composition is in a range of from 40 to 667.

In other words an ungelled resin composition of the invention has a content, from whatever source, of easily hydrolyzable Y moieties of from 25 milliequivalents per gram to 1.5 milliequivalents per gram of ungelled resin composition. Preferred resin compositions of the invention can be cured in the presence of atmospheric moisture and a suitable catalyst at a temperature of less than or equal to 250 degrees Fahrenheit (°F., 121 degrees Celsius, °C.) within 3 hours.

The present invention also is directed to methods for producing ungelled resin compositions of the invention.

Additionally, the present invention is for a nonaqueous composition, particularly a nonaqueous coating composition, containing an ungelled resin composition of the invention. Preferred coating compositions containing an ungelled resin composition of the invention can be cured in the presence of atmospheric moisture and a suitable catalyst at a temperature of less than or equal to 250 degrees F. (121 degrees C.) within 3 hours.

DETAILED DESCRIPTION OF THE INVENTION

A resin composition of the present invention is ungelled and contains a compound having in a molecule thereof at least one group containing a silicon atom which group is selected from:

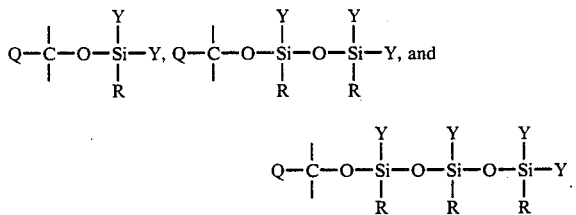

wherein Q represents the residue from an organic polyol selected from the group consisting of (1) simple diols, triols and higher hydric alcohols, (2) polyester polyols, (3) polyether polyols, (4) amide-containing polyols, (5) epoxy polyols and (6) polyhydric polyvinyl alcohols; and each R, which may be the same or different, represents hydrogen; or a $C_1$-$C_{10}$ group joined to Si through an Si—C linkage optionally containing a primary amino group, a secondary amino group, a tertiary amino group, a polyamino group, a mercapto group, a methacrylato group, an acrylato group, a urea group, a cyclic urea group, a urethane group, a 1,2-epoxy group, an ester group, an ether group, a thioether group, an amido group, an imidazolinyl group, a cyano group, a vinyl group, an allyl group and/or a halo group; and Y represents an easily hydrolyzable group; provided that said ungelled resin composition contains an amount of easily hydrolyzable Y moieties directly bonded to silicon atoms such that the ratio of the number of grams of said ungelled resin composition to equivalents of easily hydrolyzable Y moieties in said ungelled resin composition is in a range of from 40 to 667, preferably in a range of from 40 to 400, and more preferably in a range of from 40 to 200. In other words, an ungelled resin composition of the invention has a total content of easily hydrolyzable Y moieties of from 25 milliequivalents to 1.5 milliequivalents, preferably of from 25 to 2.5 milliequivalents, more preferably of from 25 to 5.0 milliequivalents, per gram of ungelled resin composition.

In the aforesaid definition of R, it is to be understood that the $C_1$-$C_{10}$ group joined to Si through an Si—C linkage can be saturated or can contain aromatic and/or ethylenic unsaturation. It is preferred that for the moieties Y, that not all of these moieties are phenyl.

It is preferred that a hydrophobic organic polyol be employed as organic polyol for preparation of an ungelled resin composition of the invention. The term "hydrophobic organic polyol" is intended to mean an organic polyol having limited compatibility with water as determined by the following procedure. Thirty parts by weight of organic polyol and 70 parts by weight of water are thoroughly mixed together at 80 degrees Celsius (degrees C.) for 5 minutes. Upon cooling to room temperature, if the organic polyol/water mixture separates into two phases, the organic polyol is considered herein to be a hydrophobic organic polyol useful for the preparation of preferred ungelled resin compositions of the invention.

As used herein, the term "ungelled" as applied to a resin composition of the invention is understood to mean that the resin composition is itself liquid at 25 degrees C. or is capable of being liquefied in the presence of a suitable solvent at 25 degrees C. Preferred ungelled resin compositions of the invention are those which are liquid at 25 degrees C. in the presence of suitable solvents.

Resin compositions of the invention can be cured to a tack free state in the presence of atmospheric moisture and a suitable catalyst at a temperature of less than or equal to 121 degrees C. within 3 hours. Preferred resin compositions of the invention can be cured to a tack free state in the presence of atmospheric moisture and a suitable catalyst at a temperature of 25 degrees C. within 24 hours. By "tack free" is meant that a film of the cured resin composition having a thickness of about 1 mil (about 25 microns) will not feel sticky to the touch when pressed with a finger.

Examples of groups which can represent the easily hydrolyzable group Y include —OR$^1$,

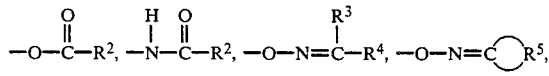

and the monohydroxy and/or cyclic $C_2$-$C_3$ residue of a 1,2- or 1,3-glycol,
wherein
R$^1$ represents $C_1$-$C_3$ alkyl, preferably $C_1$-$C_2$ alkyl, and most preferably methyl,
R$^2$ independently represents H or $C_1$-$C_4$ alkyl,
R$^3$ and R$^4$ independently represent H, $C_1$-$C_4$ alkyl, $C_6$-$C_8$ aryl and
R$^5$ represents $C_4$-$C_7$ alkylene.
Of the above examples of hydrolyzable groups Y, the groups

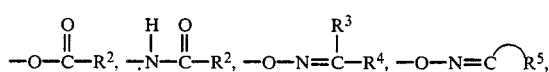

and the monohydroxy and/or cyclic $C_2$-$C_3$ residue of a 1,2- or 1,3-glycol as defined above, are less preferred than the hydrolyzable group —OR$^1$ as defined above, the groups

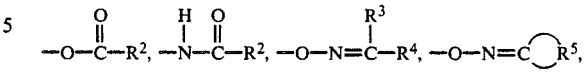

being much less preferred since they contribute to higher weight loss than desired for some applications when ungelled resins of the invention containing these groups are cured; and their products upon cure tend to have lower vapor pressures than desired for some applications which may increase the curing times and/or temperatures of ungelled resin compositions of the invention containing these groups. Thus, these groups are less preferable than the aforesaid —OR$^1$ groups, particularly methoxy and ethoxy, where short curing times, low weight loss and low curing temperatures are an important consideration.

In one preferred ungelled resin composition at least one Y represents —OR$^1$ wherein R$^1$ is a $C_1$-$C_2$ alkyl group. In one, more preferred ungelled resin composition at least one Y is a methoxy group and at least one R is methyl or vinyl.

An ungelled resin composition of the invention can be prepared, for example, by reacting an organic polyol and (a) an organosilicon-containing material containing at least 10 percent by weight of the organosilicon-containing material of a compound corresponding to the formula (VIII), R—Si(OR$^6$)$_3$ wherein R is as defined for formulas (I) through (III) above, and R$^6$ independently represents a $C_1$-$C_3$ alkyl group, preferably at least one OR$^6$ group being methoxy; (b) an organosilicon-containing material comprising at least 10 percent by weight of said organosilicon-containing material of a compound corresponding to the formula

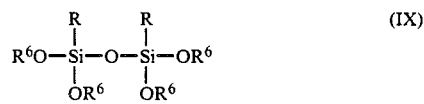

wherein R is as defined for formulas (I) through (III) above, and R$^6$ independently represents a $C_1$-$C_3$ alkyl group, preferably at least one OR$^6$ group being methoxy; (c) an organosilicon-containing material comprising at least 10 percent by weight of said organosilicon-containing material of a compound corresponding to the formula

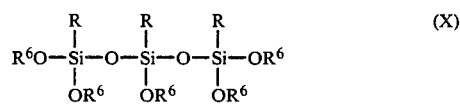

wherein R is as defined for formulas (I) through (III) above, and R$^6$ independently represents a $C_1$-$C_3$ alkyl group, preferably at least one OR$^6$ group being methoxy; (d) an organosilicon-containing material comprising a mixture containing at least 10 percent by weight of said organosilicon-containing material of a compound corresponding to the formula R—Si(OR$^6$)$_3$ and at least 10 percent by weight of said organosilicon-containing material of a compound corresponding to the formula

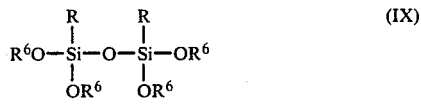

wherein R is as defined for formulas (I) through (III) above, and $R^6$ independently represents a $C_1$-$C_3$ alkyl group, preferably at least one $OR^6$ group being methoxy; or (e) a partial hydrolysis product of a compound corresponding to the formula $R—Si(OR^6)_3$ wherein R is as defined for formulas (I) through (III) above, and $R^6$ independently represents a $C_1$-$C_3$ alkyl group, preferably at least one $OR^6$ group being methoxy; and/or a combination thereof.

Examples of suitable organosilicon-containing materials for preparation of an ungelled resin composition of the invention include but are not limited to the following (1) through (4).

(1) Suitable organosilicon-containing materials optionally can include organosilicates, including partial hydrolysis products thereof, such as organosilicates corresponding to the following formula (IV),

wherein
$R^6$ represents methyl, ethyl or propyl (thus $OR^6$ is a "lower alkoxy moiety),
$R^7$ represents alkyl containing at least 4 carbon atoms, aryl, alkylaryl, arylalkyl, aryloxyalkyl, or alkyloxyalkyl, and x is an integer ranging from 0 to 2, preferably 0 or 1, and most preferably 0.

Examples of useful organosilicates include: tetramethoxysilane, tetraethoxysilane, tetra-n-propoxysilane, methoxytriethoxysilane, dimethoxydiethoxysilane, trimethoxy-n-propoxysilane, bis(2-ethylhexoxy)diethoxysilane and the like. Mixtures of organosilicates also may be employed.

Of the organosilicates corresponding to the formula (IV), above, the tetraalkoxysilanes wherein x equals 0 in formula (IV) are preferred. The tetraalkoxysilane provide a high degree of functionality to the ungelled resin compositions of the invention and enhance the ease with which the compositions of the invention can be cured. Additionally, the tetraalkoxysilanes are readily available at low cost. Furthermore, they can be used to attach modifying groups such as those represented by —$OR^7$ in formula (IV) above, an example of which is a sec-butoxy group. Of the examples of organosilicates described above, tetramethoxysilane is desirable for some purposes because of the ease with which it reacts with the hydroxyl moiety of an organic polyol. Tetraethoxysilane is also desirable since, although tetraethoxysilane is not as reactive as tetramethoxysilane, it is not as highly volatile as tetramethoxysilane.

Examples of organosilicates, other than the above organosilicates, which may be utilized in the invention include tetraacetoxysilane, diethoxydiacetoxysilane, and

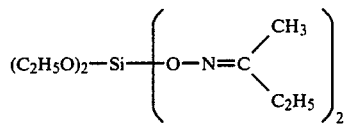

As stated previously the partial hydrolysis products of the organosilicates can be used as organosilicon-containing material for preparation of an ungelled resin composition of the invention. Hydrolyzed organosilicates provide increased reactive groups per molecule in the ungelled resins. Additionally, the hydrolyzed organosilicates can help provide low volatility to the resin compositions of the invention.

In preparing a partial hydrolysis product, for example, from an organosilicate of formula (IV) above, a controlled amount of water is employed. Typically the hydrolysis product will be prepared utilizing a ratio of moles of the organosilicate to moles of water ranging from 1:0.75 to 1:0.4. A useful guide for determining the amount of water for preparing preferred partial hydrolysis products, where organosilicates are used, can be found in formula (XI), infra. The amount of unhydrolyzed organosilicate compound in the partial hydrolysis product typically is less than 50 percent by weight of the organosilicate compound based on the total weight of starting organosilicate compound. Moreover, the partial hydrolysis product typically will contain greater than 5.0, and usually greater than 8.0, milliequivalents of residual easily hydrolyzable groups per gram of the partial hydrolysis product.

It is often desired that organosilicates and/or partial hydrolysis products thereof containing higher alkoxy, aryloxy, arylalkyloxy, alkylaryloxy, alkyloxyalkyloxy, and/or aryloxyalkyloxy moieties attached to one or more silicon atoms in addition to the easily hydrolyzable moieties may be employed for preparation of the resin compositions of the invention. The term "higher alkoxy" is intended to mean an alkoxy group having at least 4 carbon atoms such as sec-butoxy, n-pentoxy, isopentoxy, neopentoxy, hexoxy, nonoxy, isodecyloxy and the like. Examples of aryloxy, arylalkyloxy, alkylaryloxy, alkyloxyalkyloxy and/or aryloxyalkyloxy moieties include phenoxy, benzyloxy, phenylethoxy, tolyloxy, xylyloxy, 4-ethylphenoxy, phenoxyethoxy, 2-butoxyethoxy and the like. It is believed that the presence of such higher alkoxy, aryloxy, arylalkyloxy, alkylaryloxy, alkyloxyalkyloxy and/or aryloxyalkyloxy moieties from the organosilicon-containing material provides enhanced hydrolytic stability to resin compositions of the invention and enhanced hydrolytic stability to cured films prepared from the resin compositions of the invention when prepared, for example, using such organosilicates in the organosilicon-containing material. However, when an ungelled resin composition of the invention is prepared from an organosilicate (and/or partially hydrolyzed organosilicate) containing higher alkoxy, aryloxy, arylalkyloxy, alkylaryloxy, alkyloxyalkyloxy, and/or aryloxyalkyloxy moieties, the resin composition should contain a residual amount of the easily hydrolyzable moieties from the organosilicon-containing material. Moreover, the presence of such $OR^7$ type groups in an ungelled resin composition of the invention, can contribute to a slower rate of cure which may be desired for some applications. When an organosilicate is employed in the organosilicon-containing material together with an organosilane corresponding to formula (VI) infra, the product resin composition generally will contain from 25 to 1.5 milliequivalents per gram of the resin composition of the lower alkoxy moieties —OR$^6$.

(2) Suitable organosilicon-containing materials include nonfunctional organosilanes, including partial hydrolysis products thereof. As used herein, a nonfunctional organosilane is understood to mean a material corresponding to the formula, (VI),

(VI)

wherein
R$^8$ represents hydrogen, alkyl, aryl, alkylaryl, arylalkyl, or aryloxyalkyl;
X represents —OR$^1$,

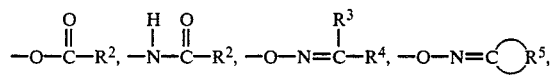

and the monohydroxy and/or cyclic C$_2$-C$_3$ residue of a 1,2- or 1,3-glycol, wherein
R$^1$ represents C$_1$-C$_3$ alkyl, preferably C$_1$-C$_4$ alkyl, and most preferably methyl,
R$^2$ independently represents H or C$_1$-C$_4$ alkyl,
R$^3$ and R$^4$ independently represent H, C$_1$-C$_4$ alkyl, C$_6$-C$_8$ aryl and
R$^5$ represents C$_4$-C$_7$ alkylene, and
m is an integer ranging from 1 to 2, preferably 1

It should be understood that the term "nonfunctional organosilane" wherever appearing herein is used for convenience to distinguish compounds corresponding to the above formula, (VI) (and/or partial hydrolysis products thereof) from those compounds (and/or partial hydrolysis products thereof) referred to herein for convenience as functional organosilanes and corresponding to the formula (VII) infra. Thus, although moieties defined by X in formula (VI) are easily displaceable by reaction with water and/or alcohol and are therefore necessarily rather reactive, they are not defined herein as "functional" as this word is used in connection with the definition of a "functional organosilane" infra.

Partial hydrolysis products of nonfunctional organosilanes can be prepared in a manner similar to the preparation of partial hydrolysis products of organosilicates discussed above. In the preparation of a partial hydrolysis product of a nonfunctional organosilane a controlled amount of water is employed. Typically the hydrolysis product will be prepared utilizing a ratio of moles of the nonfunctional organosilane to moles of water ranging from 1:0.75 to 1:0.4. A useful guide for determining the amount of water for preparing preferred partial hydrolysis products, where desired from nonfunctional organosilanes, can be found in formula (XI) infra. The amount of unhydrolyzed nonfunctional organosilane in the partial hydrolysis product typically is less than 50 percent by weight of the nonfunctional organosilane compound based on the total weight of starting nonfunctional organosilane compound. Moreover, the partial hydrolysis product typically will contain greater than 5.0, and usually greater than 8.0, milliequivalents of residual hydrolyzable groups per gram of the partial hydrolysis product.

Typically, when a nonfunctional organosilane (and/or a partial hydrolysis product thereof) is utilized as organosilicon-containing material, a nonfunctional organosilane corresponding to formula (VI) in which X corresponds to —OR$^1$ as defined above is employed.

Examples of nonfunctional organosilanes corresponding to the above formula, (VI), include methyl triemethoxy silane (e.g., available from Union Carbide, Corp. as Z-163), dimethyl dimethoxy silane, methyl triethoxy silane, dimethyl diethoxy silane, dimethoxy diphenyl silane, dimethoxy methyl phenyl silane, diethoxy dipropyl silane, dimethoxy dipropyl silane, and the like. Additional examples of the nonfunctional organosilanes include amyl triethoxy silane and triethoxy silane. Compounds such as trimethyl methoxy silane, trimethyl ethoxy silane, and ethoxy tripropyl silane may be employed where desired in limited, controlled amounts for modification purposes.

The nonfunctional organosilanes (and/or partial hydrolysis products thereof) contribute to water resistance, toughness, and stain resistance of cured films prepared from compositions containing ungelled resin compositions of the invention incporating these nonfunctional organosilanes (and/or partial hydrolysis products thereof). Trialkoxysilanes corresponding to formula (VI) above (i.e., m equals 1 and X represents —OR$^1$) are preferred, those in which R$^8$ represents hydrogen, methyl, ethyl, or phenyl and —OR$^1$ represents methoxy or ethoxy being more preferred, and those in which R$^8$ represents methyl and —OR$^1$ represents methoxy being most preferred. Moreover, the dimethyl dialkoxy silanes corresponding to formula (VI) above are less desirable than the trialkoxy silanes since it is believed that the dimethyl dialkoxy silanes tend to decrease the adhesion to the substrate of cured films prepared form compositions of the inventions incorporating the dimethyl dialkoxy silanes.

As stated above, trialkoxy silanes corresponding to formula (VI) such as methyl trimethoxy silane (and/or partial hydrolysis products thereof) are especially preferred as organosilicon-containing material. Phenyl trialkoxy silane or trialkoxy silanes wherein —R$^8$ in formula (VI) is represented by an aliphatic group containing more than about 10 carbon atoms are less desirable than methyl trimethoxy silane since they tend to decrease the ease of curing of ungelled resins of the invention and compositions of the invention containing such ungelled resin compositions. However, phenyl trialkoxy silanes often help the weatherability of films when properly cured, for example at temperatures above about 250 degrees F. (121 degrees C.) in the presence of catalyst.

Where desired, a nonfunctional organosilane (and/or partial hydrolysis products thereof) containing higher alkoxy, aryloxy, alkylaryloxy, arylalkyloxy, alkyloxyalkyloxy, and/or aryloxyalkyloxy moieties as defined previously may be used as organosilicon-containing material. Organosilicon-containing materials containing such moieties may be prepared, for example, by reacting a nonfunctional organosilane such as methyl trimethoxy silane (and/or a partial hydrolysis product thereof) with a suitable monohydric alcoholic or monohydric phenolic material so as to provide higher alkoxy, aryloxy, alkylaryloxy, arylalkyloxy, alkyloxyalkyloxy, and/or aryloxyalkyloxy moieties to the nonfunctional organosilane. Examples of such organosilanes include: pentoxydimethoxymethylsilane, isopentoxydimethoxymethylsilane, 2-3thylhexoxydimethoxymethylsilane, 2-butoxyethoxydimethoxymethylsilane, diisodecyloxymethoxymethylsilane, phenoxydimethosyphenylsilane, tolyloxydimethoxymethylsilane, phenylethyloxydimethoxymethylsilane, and the like. However, when an ungelled resin composition of the invention is prepared from a nonfunctional organosilane (and/or partially hydrolyzed nonfunctional organosilane) containing higher alkoxy, aryloxy, arylalkyloxy, alkylaryloxy, alkyloxyalkyloxy, and/or aryloxyalkyloxy moieties, the ungelled resin composition should contain a residual amount of the easily hydrolyzable moieties from the organosilicon-containing material. Moreover, the presence of such $OR^7$ type groups in a resin composition of the invention, can contribute to a slower rate of cure which may be desired for some applications.

(3) Suitable organosilicon-containing materials include functional organosilane, including partial hydrolysis products thereof. As used herein, a "functional organosilane" is intended to include materials corresponding to the following formula, (VII), $$F-G-SiX_3, \quad (VII)$$

wherein

G represents an organo group containing from 2 to 10 carbon atoms,

X represents $-OR^1$,

and the monohydroxy and/or cyclic $C_2$-$C_3$ residue of a 1,2- or 1,3-glycol, wherein $R^1$ represents $C_1$-$C_3$ alkyl, preferably $C_1$-$C_4$ alkyl, and most preferably methyl, $R^2$ independently represents H or $C_1$-$C_4$ alkyl, $R^3$ and $R^4$ independently represent H, $C_1$-$C_4$ alkyl, $C_6$-$C_8$ aryl and $R^5$ represents $C_4$-$C_7$ alkylene, and F represents amino, polyamino, 1,2-epoxy, mercapto, cyano, allyl, vinyl, urethano, halo, isocyanato, ureido, imidazolinyl, acrylato, methacrylato, a group corresponding to $-SiX_3$, wherein X is as defined above.

In accordance with the discussion of the distinction between nonfunctional organosilanes and functional organosilanes as these terms are used herein, groups defined by F above are considered to be the "functional" groups encompassed by the term "functional organosilane." It also should be understood that compounds such as vinyl trimethoxy silane, vinyl triethoxy silane, allyl trimethoxy silane and allyl triethoxy silane, which contain functional groups such as allyl and vinyl, while not literally corresponding to formula (VII) above, are considered herein to fall within the meaning of functional organosilanes. Some examples of functional organosilanes include gamma-aminopropyltrimethoxysilane, gamma-aminopropyltriethoxysilane, beta-aminoethyltrimethoxysilane, beta-aminoethyltriethoxysilane, N-beta-aminoethylaminopropyltrimethoxysilane, gamma-isocyanatopropyltriethoxysilane, mercaptopropyltriethoxysilane, vinyltrimethoxysilane, vinyltriethoxysilane, allyltrimethoxysilane, allyltriethoxysilane, glycidoxypropyltrimethoxysilane, glycidoxypropyltriethoxysilane, 4,5-epoxycyclohexylethyltrimethoxysilane, ureidopropyltrimethoxysilane, ureidopropyltriethoxysilane, chloropropyltrimethoxysilane, chloropropyltriethoxysilane, and

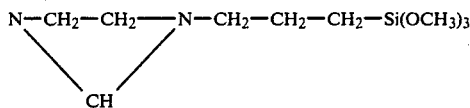

It will be appreciated that functional organosilanes containing mutually reactive functional groups such as 1,2-epoxy and amino, or amino and isocyanoto, etc., or groups defined by F above which are reactive with groups defined by X above, should be employed in controlled amounts to prepare the resin compositions of the invention so as to avoid gelation or products of undesirably high viscosity.

Although the incorporation of the functional organosilanes (and/or partial hydrolysis products thereof) in the organosilicon-containing material may be desirable for some purposes, functional organosilanes tend to be costly. Where desired, cured compositions of the invention having excellent properties can be made from ungelled resin compositions of the invention, which can be essentially self-curable in the presence of a suitable catalyst, prepared from the reaction of organic polyols with organosilicon-containing materials in which the amount of such functional organosilanes is minimized or even eliminated. Of course, various ungelled resin compositions of the invention prepared from functional organosilanes can be utilized, for example, as curing agents for materials containing groups reactive with the functional groups, F (see formula VII), present in such resin compositions. Moreover, for some purposes, ungelled resin compositions of the invention prepared from organosilicon-containing material containing a mixture of a nonfunctional organosilane and an amino-containing functional organosilane or desirable.

(4) It is to be understood that mixtures and/or partially hydrolyzed mixtures of (1) the optional organosilicates (and/or partial hydrolysis products thereof), and/or (2) the nonfunctional organosilanes (and/or partial hydrolysis products thereof), and/or (3) the functional organosilanes (and/or partial hydrolysis products thereof) may be employed as organosilicon-containing material for reaction with organic polyols for preparation of ungelled resin compositions of the invention.

In preparing a partial hydrolysis product, for example, from a nonfunctional organosilane of formula (VI) above, a controlled amount of water is utilized. Generally, the partial hydrolysis product will contain condensation product compounds having one or more siloxane linkages represented by the formula (V),

The hydrolysis and condensation reactions believed to be involved in the preparation of the ungelled partial hydrolysis products typically may be illustrated as follows:

[hydrolysis] $R^8-Si-X_3 + H_2O = R^8-Si-(OH)X_2 + HX$, and

-continued

[condensation] 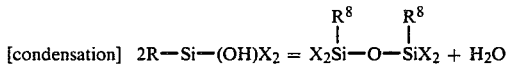 + H$_2$O wherein R$^8$ and X are as defined in formula (VI) above, X being an easily hydrolyzable group such as, for example, methoxy or ethoxy.

In one preferred method for preparing an ungelled resin composition of the invention, an organic polyol is reacted with a partial hydrolysis product of an organosilicon-containing material containing a nonfunctional organosilane corresponding to formula (VI) above, such as methyl trimethoxy silane, optionally in combination with an organosilicate corresponding to formula (IV) above and/or a functional organosilane corresponding to formula (VII) above. The amount of water generally used for preparing the partially hydrolyzed organosilicon-containing material utilized for this preferred method can be determined according to the following formula (XI), $$(E_{1,2} \times 0.5) + (E_{3,4} \times Z) = W,$$

wherein
W represents the the total moles of H$_2$O employed calculated based on the total equivalents of the easily hydrolyzable groups from organosilane compounds such as organosilicates, nonfunctional organosilanes, and functional organosilanes,
$E_{1,2}$ represents the total number of equivalents of easily hydrolyzable groups from organosilane compounds containing one or two easily hydrolyzable groups,
$E_{3,4}$ represents the total number of equivalents of easily hydrolyzable groups from organosilane compounds containing three or four easily hydrolyzable groups, and
Z is a number in the range of from 0.023 to 0.43, preferably in the range of from 0.050 to 0.33, and more preferably in the range of from 0.080 to 0.23.

It is to be understood that one equivalent of the hydrolyzable groups corresponds to one mole of the hydrolyzable groups, and one equivalent of water corresponds to ½ mole of water.

For example, just one useful mixture of organosilanes, suitable as organosilicon-containing material for preparation of a partial hydrolysis product, can contain methyl triemethoxy silane, phenyl trimethoxy silane, and methyl phenyl dimethoxy silane respectively in a molar ratio of 1.00 to 0.351 to 0.117. Such a mixture would provide 3.00 equivalents of methoxy groups from the methyl trimethoxy silane, 1.05 equivalents of methoxy groups from the phenyl trimethoxy silane, and 0.234 equivalents of methoxy groups from the methyl phenyl dimethoxy silane. Thus in formula (XI) above, $E_{1,2}$ would equal 0.234 and $E_{3,4}$ would equal 4.05; and assuming the maximum moles of water for preparation of the partial hydrolysis product according to formula (XI) (i.e., Z=0.43), the total moles of water for preparation of the partial hydrolysis product would equal 1.86 moles. Or, in other words, a maximum of 1.27 moles of water per mole of organosilane compound (i.e., 1.86 moles/1.468 moles equals 1.27).

Of course, it will be understood that the relative amounts of constituents in a partial hydrolysis product can be adjusted, for example by distilling off a portion, as desired, of volatile constituents from the partial hydrolysis product.

It will be appreciated from the disclosure herein, that the partial hydrolysis product prepared utilizing such a controlled amount of water as determined by formula (XI) above, will contain a mixture of low molecular weight compounds which contain residual hydrolyzable groups. The partial hydrolysis product typically will contain greater than 5.0, and usually greater than 8.0, milliequivalents of residual hydrolyzable groups per gram of partial hydrolysis product. There is also the possibility that the ungelled partial hydrolysis products prepared utilizing a controlled amount of water as determined from formula (XI) above, also contain a small amount of silanol-type ($\equiv$Si—OH) hydroxyl groups. However, such partial hydrolysis products generally will contain a ratio of residual hydrolyzable groups to silanol-type hydroxyl groups greater than 1.00, and typically greater than 3.00.

The partial hydrolysis of the organosilicon-containing material typically is conducted in the presence of from 0.01 to 20 percent by weight of a catalyst, which in some instances can function as a coreactant, examples of which catalyst include gamma-aminopropyl triethoxy silane, isophorone diamine, 2-amino-2-methyl-1-propanol, or the like. The percent by weight of catalyst is based on the total weight of the organosilicon-containing material. The preferred partial hydrolysis products typically contain an amount of easily hydrolyzable groups such that the ratio of the number of grams of the partial hydrolysis product to equivalents of the easily hydrolyzable groups in the partial hydrolysis product is in a range of from 40 to 300, usually in a range of from 50 to 200. In other words, the "hydrolyzable group equivalent weight" (alternatively referred to herein as "HGEW") of the partial hydrolysis product typically is in a range of from 40 to 300, usually in a range of from 50 to 200.

In one preferred embodiment of the invention, the ungelled resin composition of the invention is prepared by reacting an organic polyol with an organosilicon-containing material comprising at least 10 percent by weight of said organosilicon-containing material of a compound corresponding to the formula IX (a disiloxane) as defined above. Such an organosilicon-containing material can be prepared, for example, by the controlled hydrolysis of a trialkoxy silane compound corresponding to formula VIII above such as methyl trimethoxy silane employing a ratio of moles of the trialkoxy silane to moles of water ranging from 1.0:0.75 to 1.0:0.1, preferably ranging from 1.0:0.6 to 1.0:0.4. Such controlled hydrolysis will produce a hydrolysis product containing a mixture of compounds. The partial hydrolysis typically is conducted in the presence of from 0.01 to 20 percent by weight of a catalyst, which in some instances can function as a coreactant, examples of which catalyst include gamma-aminopropyltriethoxysilane, isophorone diamine, 2,2,4-trimethylhexamethylene-1,6-diamine, or 2-amino-2-methyl-1-propanol. A preferred hydrolysis product produced from such controlled hydrolysis typically will contain at least 10 percent by weight of the disiloxane (see formula IX) in combination with at least 10 percent by weight of the starting compound (see formula VIII) in addition to other compounds such as the trisiloxane (see formula X).

In a second preferred embodiment of the invention, the ungelled resin composition of the invention is prepared by reacting an organic polyol with an organosilicon-containing material comprising the partial hydrolysis product of a mixture containing from 1 to 10 moles of methyl trimethoxy silane, from 10 to 1 moles of methyl phenyl dimethoxy silane and from 10 to 1 moles of phenyl trimethoxy silane. The partial hydrolysis typically is conducted in the presence of a catalyst, which in some instances can function as a coreactant, examples of which catalyst include gamma-aminopropyltriethoxysilane, isophorone diamine, 2,2,4-trimethylhexamethylene-1,6-diamine or 2amino-2-methyl-1-propanol. The partial hydrolysis is conducted employed a controlled amount of water, for example, from 0.75 to 0.1 moles of water per mole of alkoxy silane groups. It has been found that often such partial hydrolysis products of methyl trimethoxy silane, methyl phenyl dimethoxy silane, and phenyl trimethoxy silane are more compatible with organic polyols than the partial hydrolysis product of methyl trimethoxy silane alone. Sometimes an alcohol such as methanol or ethanol is needed to render the partial hydrolysis product homogeneous.

As described above, an ungelled resin composition of the invention can be prepared, for example, by reacting an organic polyol with organosilicon-containing materials as described above. Typically the organic polyol is selected from (1) simiple diols, triols, and higher hydric alcohols, (2) polyester polyols, (3) polyether polyols, (4) amide-containing polyols, (5) epoxy polyols and (6) polyhydric polvinyl alcohols.

(1) Simple diols, triols, and higher hydric alcohols useful in preparation of ungelled resin commpositions of the invention include, but are not limited to, ethylene glycol; propylene glycol; 1,2-butanediol; 1,4-butanediol-1,3-butanedial; 2,2,4-trimethyl; 1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis(hydroxymethyl)cyclohexane; 1,2-bis(hydroxyethyl)cyclohexane; 2,2-dimethyl-3-hydroxypropyl-2,2-dimethyl-3-hydroxypropionate; diethylene glycol; dipropylene glycol; the alkoxylation product of 1 mole of 2,2-bis(4-hydroxyphenyl)propane (i.e., bisphenol-A) and 2 moles of propylene oxide available as DOW-565 from DOW Chemical Company; dimethyl hydantoin diols; isocyanuric acid triols; and the like. Of the above simple diols, triols and higher hydric alcohols, the 1,2- and 1,3-diols are less preferred.

(2) Polyester polyols useful in the preparation of ungelled resins of the invention include but are not limited to the known polyhydroxyl-functional polyesters. Polyester polyols can be prepared by conventional techniques by reacting simple diols, triols and higher hydric alcohols such as those described in paragraph (1) above (optionally in combination with monohydric alcohols) with polycarboxylic acids.

Examples of suitable polycarboxylic acids for preparation of polyester polyols include: phthalic acid; isophthalic acid; terephthalic acid; trimellitic acid; tetrahydrophthalic acid, hexahydrophthalic acid; tetrachlorophthalic acid; adipic acid, azelaic acid; sebacic acid; succinic acid; malic acid; glutaric acid; malonic acid; pimelic acid; suberic acid; 2,2-dimethylsuccinic acid; 3,3-dimethylglutaric acid; 2,2-dimethylglutaric acid; maleic acid, fumaric acid, itaconic acid; and the like. Anhydrides of the above acids, where they exist, can also be employed and are encompassed by the term "polycarboxylic acid". In addition, certain materials which react in a manner similar to acids to form polyester polyols are also useful. Such materials include lactones such as caprolactone, propylolactone and methyl caprolactone, and hydroxy acids such as hydroxycaproic acid and dimethylolpropionic acid. If a triol or higher hydric alcohol is used, a monocarboxylic acid, such as acetic acid and benzoic acid, may be used in the preparation of the polyester polyol, and for some purposes, such a polyester polyol may be desirable. Moreover, polyester polyols useful for reaction with organosilicon-containing material are understood to include polyester polyols modified with fatty acids or glyceride oils of fatty acids (i.e., conventional alkyd polyols containing such modification). Another polyester polyol suitable for reaction with organosilicon-containing material is one prepared by reacting an alkylene oxide such as ethylene oxide, propylene oxide, butylglycidyl ether, and the glycidyl esters of organic acids such as CARDURA-E, with the carboxylic acid to form the corresponding ester.

Examples of the optional monohydric alcohols which may be used to prepare the polyester polyols include: ethanol, propanol, isopropanol, n-pentanol, neopentyl alcohol, 2-ethoxyethanol, 2-methoxyethanol, 1-hexanol, cyclohexanol, 2-methyl-2-hexanol, 2-ethylhexyl alcohol, 1-octanol, 2-octanol, 1-nonanol, 5-butyl-5-nananol, isodecyl alcohol, and the like.

Alkyd polyols typically are produced by reacting polyhydric alcohols, polycarboxylic acids, and fatty acids derived from drying, semi-drying or non-drying oils in various proportions depending upon the extent of hydroxyl functionality and properties desired in the alkyd polyol. The techniques of preparing such alkyd polyols are well known generally. Usually, the process involves reacting together the polycarboxylic acid and fatty acid or partial glyceride thereof and the polyhydric alcohol (the latter usually in stoichiometric excess) in the presence of a catalyst such as litharge, sulfuric acid, or sulfonic acid to effect esterification with evolution of water. Examples of polyhydric alcohols typically used for preparation of the alkyd polyols include the simple diols, triols and higher hydric alcohols known in the art including but not limited to the simple diols, triols, and higher hydric alcohols in paragraph (1) above. Examples of polycarboxylic acids suitable for preparation of the alkyd polyols include those set forth previously in the description of polycarboxylic acids useful for preparing polyester polyols. Examples of suitable fatty acids include saturated and unsaturated acids such as stearic acid, oleic acid, ricinoleic acid, palmitic acid, linoleic acid, linolenic acid, licanic acid, elaeostearic acid, clupanodonic acid and mixtures thereof. The fatty acids may be in the form of the free acids with sufficient excess of the polyhydric alcohol being incorporated into the esterification mixture to compensate for their inclusion. However, in many instances, glyceride oils may be employed which have been partially alcoholized with sufficient amount of a polyhydric alcohol such as glycerol to supply the requisite amount of available hydroxyls for formation of the alkyd polyol.

(3) Polyether polyols useful in the preparation of ungelled resin compositions of the invention include but are not limited to the known polyhydroxyl-functional polyethers. Examples of polyether polyols include the poly-(oxyethylene)glycols and poly-(oxypropylene)-glycols prepared by the acid or base catalyzed addition of ethylene oxide or propylene oxide to initiators such as ethylene glycol, propylene glycol, diethylene glycol and dipropylene glycol and by the copolymerization of ethylene oxide and propylene oxide with initiator compounds such as trimethylolpropane, glycerol, pentaerythritol, sorbitol, sucrose and the like. Examples of polyether polyols also include the generally known poly-(oxytetramethylene)glycols prepared by the polymerization of tetrahydrofuran in the presence of Lewis acid catalysts such as boron trifluoride, tin (IV) chloride, antimony pentachloride, antimonytrichloride, phosphorous pentafluoride, and sulfonyl chloride. Other examples of polyether polyols include the generally known reaction products of 1,2-opoxide-containing compounds with polyols such as those included in the description above of simple diols, triols, and higher hydric alcohols for the preparation of polyester polyols.

(4) Amide-containing polyols are generally known and typically are prepared from any of the above-described diacids or lactones and diols, triols and higher alcohols, and diamines or aminoalcohols as illustrated, for example, by the reaction of neopentyl glycol, adipic acid and hexamethylenediamine. The amide-containing polyols also may be prepared through aminolysis by the reaction, for example, of carboxylates, carboxylic acids, or lactones with aminoalcohols. Examples of suitable ethylenediamine, phenylenediamines, N-methyl-monoethanolamine, isophorone diamine, 1,8-methanediamine and the like.

(5) Epoxy polyols are generally known and can be prepared, for example by the reaction of glydicyl ethers of polyphenols such as the diglycidyl ether of 2,2-bis(4-hydroxyphenyl)propane, with polyphenols such as 2,2-bis(4-hydroxyphenyl)propane. Epoxy polyols of varying molecular weights and average hydroxyl functionality can be prepared depending upon the ratio of starting materials used.

(6) Polyhydric polyvinyl alcohols are generally known and can be prepared, for example, by the additional polymerization of vinyl acetate in the presence of suitable initiators followed by hydrolysis of at least a portion of the acetate moieties. In the hydrolysis process, hydroxyl groups are formed which are attached directly to the polymer backbone. In addition to homopolymers, copolymers of vinyl acetate and monomers such as vinyl chloride can be prepared and hydrolyzed in similar fashion to form polyhydric polyvinyl alcohol-polyvinyl chloride copolymers.

The molecular weight of suitable organic polyols for preparation of ungelled resin compositions of the invention can vary within wide limits depending on the nature of the specific classes of polyols as described above chosen for preparation of the ungelled resins. The hydroxyl equivalent weight of organic polyols suitable for preparation of the ungelled resin compositions of the invention generally is less than 3,000, preferably less than 1,000, and more preferably less than 300.

The above specific examples of compounds in the classes (1) through (5) of organic polyols should be considered to be merely illustrative of compounds within those classes which may be utilized for preparation of ungelled resin compositions of the invention.

When an ungelled resin composition of the invention is prepared by reaction of an organic polyol and an organosilicon-containing material as described above, the organic polyol and the organosilicon-containing material are reacted typically under a blanket of a non-reactive gas such as nitrogen at a temperature ranging from about 50 degrees C. to about 180 degrees C. for 0.5 to 50 hours usually with removal by distillation of the low boiling volatile reaction product such as the volatile alcohol. If distillate is removed, a fractionating column may be used as a precaution to prevent removal of the starting materials. Depending on the vapor pressures of the starting materials, for example where materials having high vapor pressures are employed, often the reaction is conducted under pressure.

Often the starting materials do not form a homogeneous mixture at ambient temperature to begin with; however as the reaction is carried out the materials usually form a homogeneous mixture as the reaction proceeds. Moreover, materials such as gamma-glycidoxypropyl trimethoxy silane, QP8-5314 (a mixture believed to contain 25 mole percent methylphenyldimethoxysilane and 75 mole percent phenyltrimethoxysilane; available from Dow Corning Corp.) and n-methylpyrrolidone can be utilized in the reaction mixture to aid in rendering the starting materials compatible.

Depending on the choice of reactants and optionally catalysts, the reaction may be conducted under milder or more severe conditions of time and temperature. For example, the reaction may be conducted at a temperature such as 80 degree C. for about 1 hour with removal of alcohol. Or where the reaction is carried out without a catalyst, the reaction may be conducted for example at 175 degrees C. for 3 or more hours. The presence of a catalytic amount of catalyst such as stannous octoate facilitates removal of volatile alcohol. Typically, a solvent is not included in the reaction medium. However, a limited amount of solvent may be desired particularly where the product is to be used as essentially the only film forming component in a coating composition or where the product is to be used in a high solids coating composition.

Ungelled resin compositions of the invention are suitable for utilization in low solids and high solids coating applications. A high solids coating composition as defined herein typically contains at least 50 percent, preferably at least 60 percent, and most preferably at least 70 percent, by weight resin solids based on the weight of that portion of the composition including the reaction product (i.e., ungelled resin composition) and organic solvent but excluding the weight of pigments, fillers and the like which may be present in the coating composition. However, where desired, solvents which are compatible with the reactants can be employed. Moreover, the product may be thinned with solvent. Examples of such solvents include conventional ketones such as methyl ethyl ketone, hydrocarbons such as xylene and toluene, and mono- and kialkylethers of diethylene glycol such as diethylene glycol dibutyl ether and diethylene glycol diethyl ether and low molecular weight alcohols such as methanol and ethanol. Moreover, it has been found that low molecular weight alcohols such as methanol and ethanol can be utilized to enhance the stability of ungelled resin compositions of the invention. When desired, water can be employed to hydrolyze an unhydrolyzed organosilicon-containing material prior to, during, or even after reaction of the organosilicon-containing material with the organic polyol.

Where water is employed in the reaction mixture, the amount of water must be controlled because water is a reactant in the reaction mixture. Moreover, when water is present as a separate phase, a water soluble solvent is often used to make the mixture homogeneous. Additionally, a moisture-free atmosphere usually is employed because uncontrolled hydrolysis of the organosilicon-containing material during product preparation is not desired and also in order to minimize the water content in the ungelled resin product.

Depending on the particular choice of reactants, the reaction between the organosilicon-containing material and organic polyol may be sluggish, and where desired, a catalyst may be utilized to speed up the reaction. Examples of such catalysts include: acids such as paratoluenesulfonic acid; tin-containing compounds such butylstannoic acid, dibutyl tin oxide, stannous octoate and dibutyl tin dilaurate; titanates such as tetraisopropyltitanate and tetrabutyltitanate; amino compounds such as aminopropyltriethoxysilane, isopropanol amine, 2-amino-2-methyl-1-propanol, isophorone diamine, 2,2,4-trimethyl hexamethylene diamine, and the like. Of course, where functional organosilanes as described previously herein are employed for organosilicon-containing material, the choice of catalyst will be in part governed by the functional groups present so as to avoid gelation. Moreover, the extent of reaction can be monitored by following the amount of product HY given off during the reaction. When catalysts are utilized in the preparation of the ungelled resin compositions of the invention, reaction temperatures lower than about 120 degrees C. are feasible.

When an ungelled resin composition of the invention is prepared from the reaction of an organosilicon-containing material as described above and an organic polyol, the amounts by weight of the organosilicon-containing material and the organic polyol for preparation of the ungelled resin composition may vary. Depending on the particular choice of organic polyol and organosilicon-containing material, the mole ratio of hydroxyl moieties (i.e., C—OH) from the organic polyol to hydroxyl-reactive Y moieties, for example such as lower alkoxy moieties, from the organosilicon-containing material may vary. However, an amount of organic polyol and an amount of organosilicon-containing material generally will be chosen such that the ungelled resin composition of the invention will contain an amount of the Y moieties such that the ratio of the number of grams of ungelled resin composition to equivalents of the Y moieties in the ungelled resin composition is in a range of from 40 to 667, preferably in a range from 40 to 400, and more preferably in a range of from 40 to 200. A useful guide is to choose the organic polyol and organosilicon-containing starting materials so as to provide a ratio of equivalents of hydroxyl moieties from the organic polyol to equivalents of hydroxyl-reactive Y moieties, such as lower alkoxy moieties, from the organsilicon-containing material ranging from 1:2 to 1:100. Typically a ratio of equivalents of 1:3 to 1:20 is employed. It will be understood that 1 equivalent of hydroxyl moieties equals 1 mole of hydroxyl moieties and 1 equivalent of the reactive Y moieties equals 1 mole of the hydroxyl-reactive Y moieties. An ungelled resin composition of the invention will contain a total content of Y moieties of from 25 to 1.5 milliequivalents, preferably of from 25 to 2.5 milliequivalents, more preferably of from 25 to 5.0 milliequivalents, per gram of ungelled resin composition. Moreover, typically the content of hydroxyl moieties (i.e., C—OH) in the ungelled resin reaction product from the organic polyol will range from 0 milliequivalents to 10 milliequivalents per gram of reaction product, usually from 0 to 5 milliequivalents per gram of reaction product. As used herein, one milliequivalent of either the hydroxyl moiety (i.e., C—OH) or the moiety Y bonded to Si is equal to one millimole of the functional group.

Most of the ungelled resin compositions of the invention are storage stable for periods of at least 3 months, preferably for one year in airtight containers so as to prevent the introduction of moisture into the composition containing the ungelled resin composition. When desired, they may be stored under dry nitrogen. Also, product compatible materials which easily hydrolyze so as to act as scavengers for water may be combined with the composition. Examples of such easily hydrolyzable product compatible materials include organosilicates, organosilanes, or materials such as ethylorthoformate and 2,2-dimethoxy propane. Water-scavenging amounts or organosilicates or organosilanes can be incorporated with the product either by combining them with the ungelled resin composition of the invention after the resin composition is prepared or by employing an excess of organosilicon-containing material during the reaction of this material with the organic polyol. To those that are not as stable as desired, such as some prepared using a catalyst, the ungelled resin compositions of the invention can be stabilized by using trace amounts of compounds which act as inhibitors such as boron trifluoride etherate (a 1 to 1 mole ratio of boron trifluoride in diethyl ether). Moreover, as discussed previously herein, low molecular weight alcohols such as methanol and ethanol can be utilized to enhance the stability of the ungelled resin compositions.

The ungelled resin compositions of the invention advantageously may be utilized, with or without the presence of a catalyst, as essentially a sole film former for coating various substrates such as metal, paper, wood, wood furniture, hardboard, plastics, glass, and the like. Compositions based on ungelled resin compositions of the invention can provide automotive quality coatings for both original equipment manufacture and automotive refinishing applications which can be cured at low temperatures (less than 180 degrees F., 82.2 degrees C.). Preferred compositions based on ungelled resin compositions of the invention for automotive refinishing applications can be cured at ambient temperature (e.g., 25 degrees CO in the presence of atmospheric moisture.

Examples of catalysts which may be used to promote the cure of compositions containing ungelled resin compositions of the invention include: salts such as tin naphthenate, tin benzoate, tin octoate, tin butyrate, dibutyltin dilaurate, dibutyltin diacetate, iron stearate and lead octoate; titanates such as tetraisopropyl titanate and tetrabutyl titanate; oxides such as dibutyltin oxide; and bases such as isophorone diamine, methylene dianiline, imidazole, gamma-aminopropyl triethoxy silane, aminoalcohols such as 2-amino-2-methyl-1-propanol and other basic nitrogen-containing compounds.

Compositions containing ungelled resin compositions of the invention can contain organic solvents, examples of which include: alcohols such as methanol, ethanol, propanol, buanol and the like; the mono- or dialkyl ethers of ethylene and propylene glycol such as ethylene glycol monoethyl ether, ethylene glycol monobutyl ether, ethylene glycol dibutyl ether, ethylene glycol monoethyl ether acetate, ethylene glycol monohexyl ether acetate, propylene glycol monoethyl ether and propylene glycol dibutyl ether; the mono- and dialkyl ethers of diethylene glycol such as diethylene glycol monoethyl ether, diethylene glycol dibutyl ether, diethylene glycol diethyl ether and diethylene glycol monobutyl ether acetate; ketones such as methylethyl ketone; esters such as butyl-acetate; hydrocarbons such as xylene and toluene; N-methyl-2-pyrrolidone; dimethyl formamide; and mixtures thereof. As used herein, the term "organic solvents" is intended to include not only true solvents, but also organic liquid diluents and constituents of the compositions.

Coating compositions utilizing ungelled resin compositions of the invention may be applied to substrates using any suitable technique such as brushing, dipping, spraying, roll coating, doctor blade coating, curtain coating, etc.

Compositions based on ungelled resin compositions of the invention may be pigmented or unpigmented and may be utilized in the presence of various generally known additives such as flow control agents, surfactants, leveling agents, anti-mar agents, fungicides, mildewcides, and the like. Examples of pigments include any of the generally known pigments including extender pigments used in the coatings and resins industry such as titanium dioxide, magnesium carbonate, dolomite, talc, zinc oxide, magnesium oxide, iron oxides red and black, barium yellow, carbon black, strontium chromate, lead chromate, molybdate red, chromoxide green, cobalt blue, organic pigments of the azo series, metallic flake pigments such as aluminum flakes and nickel flakes, etc. Mixtures of pigments also may be employed.

Additionally, ungelled resin compositions of the invention can be utilized as curing agents, in addition to or in substitution for generally known curing agents, for polyols generally known for use in coating compositions, examples of which polyols include but are not limited to simple diols, triols and higher hydric alcohols; arcylic polyols; polyurethane polyols; polyester polyols; polyether polyols; amide-containing polyols; polyhydroxyl-functional epoxy resins; polyhydric polyvinyl alcohols; etc.

The ungelled resin compositions of the invention also may be utilized as additives to modify the properties of generally known coating compositions compatible with additive amounts of the resin compositions. For example, the resin compositions of the invention may be incorporated in additive amounts to modify such coating compositions properties as rheological properties such as viscosity, surface tension, flow, leveling, etc. An "additive amount" is understood herein to mean an amount of up to about 5 percent by weight based on the weight of resin solids in the coating composition (i.e., excluding pigments and solid fillers).

The ungelled resin compositions of the invention also may be utilized in adhesive, sealants, inks, etc.

The following examples illustrate the invention and are not to be construed as limiting it to their details. As used herein, "pbw" means "parts by weight". All parts and precentages in the examples and throughout the specification are by weight unless specifically indicated otherwise.

EXAMPLE 1

(a) Preparation of Polyether Polyol

A reaction vessel equipped with stirrer, thermometer and means for heating is charged with 6,000 g of the diglycidyl ether of bisphenol-A (EPON 828 available from Shell Chemical Company) and 6,000 g of n-butanol. The contents of the vessel are heated over a period of 35 minutes to a temperature of 58 degrees C. at which time the contents of the vessel are observed to be clear and homogeneous. Next, about half of a solution of 4 milliliters (ml) of boron trifluoride etherate in 30 ml of n-butanol is added over ½ hour to the vessel while the temperature ranges between 55 and 60 degrees C. after which heating is discontinued for a period of 19 minutes while the temperature remains between 60 and 61 degrees C. Next, the remaining portion of the boron trifluoride etherate solution is added to the vessel and the contents of the vessel are heated to a temperature of 70 degrees C. over a period of 16 minutes. For the next 45 minutes the temperature is maintained between 70 and 78 degrees C. after which period an additional 2 ml of boron trifluoride etherate solution (as described above) is added to the vessel over a 9 minute period. Thereafter, heating is discontinued and the contents of the vessel allowed to cool overnight to ambient temperature. Next, the contents of the vessel are heated to 90 degrees C. over 1 hour and 15 minutes and thereafter held at 90 to 94 degrees C. for a period of 4 hours and 55 minutes. Thereafter, heating is discontinued and the contents of the vessel allowed to cool to ambient temperature. Next, the epoxy equivalent weight of the contents of the vessel is determined to be infinity.

Next, the reaction vessel is set up for distillation and the contents of the vessel are heated to 123 degrees C. whereupon the formation of distillate containing butanol is observed to begin. Distillation is continued for about 1 hour while the pot temperature ranges between 140 and 160 degrees C. during which period a total of 1,264 g of distillate containing n-butanol is collected. Thereafter, heating is discontinued and the contents of the vessel allowed to cool to ambient temperature. The resulting product is a viscosity at room temperature of 146.6 Stokes, a hydroxyl value of 249, and a solids content determined at 105 degrees C. for two hours of 94.4 percent by weight.

(b) Preparation of Ungelled Polyether Resin of the Invention

A reaction vessel is charged at room temperature with 300 g of the polyether polyol reaction product of part (a) immediately above, 50 g of gamma-glycidoxypropyl trimethoxy silane, 50 g of QP8-5314 (a mixture believed to contain 25 mole percent methylphenyldimethoxysilane and 75 mole percent phenyltrimethoxysilane; available from Dow Corning Corp.) and 100 g of tetraethyl orthosilicate. The contents of the vessel are heated to 118 degress C. at which temperature slight boiling is observed. The contents of the vessel are maintained for 1 hour and 44 minutes in a temperature range of from 118 to 165 degrees C. after which heating is discontinued and the contents of the vessel allowed to cool to room temperature. During the aforesaid reaction a total of 50 g of volatile material containing methanol is given off from the reaction vessel.

The resulting product is an ungelled resin composition of the invention.

(c) Preparation and Cure of a Coating Composition of an Ungelled Resin of the Invention A coating composition is prepared by mixing 10.0 g of the ungelled resin composition of part (b) immediately above with 0.2 g of dibutyl tin dilaurate. A sample of the coating composition is applied to a primed steel panel using a No. 60 wire wound bar and cured for 30 minutes at 121 degrees C. The resultant cured coating is clear and glossy and withstands 34 double rubs with a cloth soaked in methyl ethyl ketone.

(d) Preparation of a Partially Hydrolyzed Organosilane

To a flask equipped with addition funnel, reflux condenser, thermometer, heater, stirrer and means for maintaining a nitrogen blanket is charged at room temperature under a blanket of nitrogen 2346.2 g of methyl trimethoxy silane and 23.7 g of gamma-aminopropyl-triethoxysilane. Next the contents of the flask are heated over a period of 15 minutes to a temperature of 50 degrees C. at which point the slow addition of deionized water to the contents of the flask is begun. While the contents of the flask are stirred, a total of 171 g of deionized water is added over a period of 48 minutes. The contents of the flask are heated over 25 minutes to reflux and thereafter held at reflux for 3 hours and 5 minutes while the pot temperature ranges from 66 to 68 degrees C. Thereafter, heating is discontinued and the contents of the flask are allowed to cool over a period of 50 minutes to 55 degrees C. at which temperature 634.4 g of gamma-aminopropyltriethoxysilane is added to the flask. The contents of the flask are allowed to cool further to 50 degrees C. whereupon the addition of the diglycidyl ether of hydrogenated bisphenol-A is begun. A total of 634.4 g of the diglycidyl ether of hydrogenated bisphenol-A is added to the flask over a period of 1 hour while the pot temperature ranges bewteen 50 and 58 degrees C. Next, the contents are heated to reflux over the next 15 minutes and held at reflux for 2½ hours while the pot temperature is maintained at 68 degrees C. Thereafter, heating is discontinued and the contents of the flask are allowed to cool to ambient temperature overnight. Next the contents are heated over a period of 25 minutes to 56 degrees C. whereupon 190.4 g of gamma-glycidoxypropyl trimethoxy silane is added to the flask. Over the next 15 minutes the temperature is raised to 60 degrees C. and thereafter held at 60 degrees C. for 3 hours after which is contents of the flask are allowed to cool to room temperature.

The resulting product contains a partially hydrolyzed organosilane. The resulting partially hydrolyzed organosilane has a No. 2 Shell Cup viscosity of 21.3 seconds at room temperature, a Gardner color value of 1, an epoxy equivalent weight of infinity, an amine equivalent weight of 1499.2, and has a total solids content measured for 1 hour at 110 degrees C. of 46.8 percent by weight.

(e) Preparation and Cure of a Coating Composition of the Invention

A coating composition is prepared by mixing 18.5 g of the ungelled resin composition of part (b) immediately above with 26.2 g of the partially hydrolyzed organosilane of part (d) immediately above and 0.6 g of dibutyl tin dilaurate. A sample of the coating composition is applied to a primed steel panel using a No. 60 wire wound bar and is cured for 30 minutes at 121 degrees C. The resultant cured coating is clear and glossy; withstands greater than 100 double rubs with a cloth soaked in methyl ethyl ketone; has a Sward hardness of 20; and shows no visual evidence of deterioration when subjected to a water spot test. The spot test is conducted by applying a few milliliters of water to the cured coating and covering with a watch glass for about 16 hours.

EXAMPLE 2

(a) Preparation of a Polyester-Polyamide Polyol

A reaction vessel is charged at room temperature with 476 g of 2-amino-2-ethyl-1,3-propane diol, 344 g of butyrolactone and 0.4 g of stannous octoate. The contents of the vessel are mixed well and thereafter heated at about 93.3 degrees C. for 6 hours. An infrared analysis of the resulting product shows the absence of lactone moieties in the product. The resulting product is a polyester-polyamide polyol composition.

(b) Preparation of an Ungelled Resin of the Invention

A reaction vessel equipped with thermometer, reflux condenser, stirrer and means for maintaining a nitrogen blanket is charged at ambient temperature with 1021.5 g of methyl trimethoxy silane, 66 g of gamma-aminopropyl trimethoxy silane and 307.5 g of the polyester-polyamide polyol composition of part (a) immediately above. The contents of the vessel are heated to reflux over 22 minutes (pot temperature of 70 degrees C.) and held at reflux for 3 hours. Next, the vessel is equipped with a distillation head. Thereafter, the contents of the vessel are heated from 70 to 94 degrees C. over a period of 1½ hours while a total of 250 ml of distillate is collected. Thereafter, heating is discontinued and the contents of the vessel allowed to cool to ambient temperature overnight. Next, the contents of the vessel are heated to 96 degrees C. and distillation is resumed while the pot temperature is maintained between 96 and 117 degrees C. (head temperature between 76 and 96 degrees C.) for 1 hour and 42 minutes while an additional 150 ml of distillate is collected.

The resulting product is an ungelled resin composition of the invention.

(c) Preparation and Cure of a Coating Composition

A first coating composition is prepared by mixing 10 g of an acrylic polyol resin[1], 14 g of the ungelled resin composition of part (b) immediately above and 0.40 g of dibutyl tin dilaurate.

A second coating composition is prepared by mixing 10 g of the acrylic polyol resin[1], 10 g of the ungelled resin composition of part (b) immediately above and 0.32 g of dibutyl tin dilaurate.

[1] An acrylic polyol resin (30.0 percent by weight methyl methacrylate, 25.0 percent by weight styrene, 19.0 percent by weight butyl methacrylate, 12.0 percent by weight 2-ethylhexyl acrylate and 14.0 percent by weight hydroxyethyl acrylate) at from 58 to 60 percent by weight resin solids in a mixture of solvents (74.7% by weight butyl acetate, 15.1% by weight naphtha, and 10.2% by weight toluene) and having a Gardner-Holdt bubble tube viscosity of about X-Z+.

Each of the compositions is applied at a wet film thickness of about 3 mils (about $8 \times 10^{-2}$ millimeters) to steel panels treated with an iron phosphate pretreatment (BONDERITE-1000). The resulting coatings are cured for 24 hours at room temperature. Both of the resultant cured films are clear and glossy.

The cured film prepared from the first coating composition withstands 38 "double rubs" with a cloth soaked in methylethyl ketone. As used herein "double rubs" refer to back and forth finger rubs across the coating with a cloth dipped in solvent.

The cured film prepared from the second coating composition withstands 49 double rubs with a cloth soaked in methylethyl ketone.

EXAMPLE 3

(a) Preparation of an Ungelled Resin of the Invention

A reaction vessel equipped with stirrer, thermometer and reflux condenser is charged at room temperature with 681 g of methyl trimethoxy silane, 44 g of gamma-aminopropyl trimethoxy silane and 300 g of a polyester triol (PCP 0301 available from Union Carbide Corp.).

The contents of the vessel are heated over 1 hour and 10 minutes to reflux (pot temperature of 81 degrees C.) and held at reflux for 50 minutes while the pot temperature ranges from 81 to 82 degrees C. Thereafter heating is discontinued and the contents of the vessel allowed to cool overnight to ambient temperature. Next, the reaction vessel is equipped with a distillation head. Thereafter, the contents of the vessel are slowly heated to 82 degrees C. and thereafter held in a range of from 82 to 108 degrees C. (head temperature of about 72 to 76 degrees C.) while a total of 400 ml of distillate containing methanol is collected. Thereafter, heating is discontinued and the contents of the vessel allowed to cool to ambient temperature. The resulting product is an ungelled resin composition of the invention. The ungelled resin composition has a viscosity of 1.0 Stokes, a Gardner color value of 1, an amine equivalent weight of 2,404, and has a solids content measured for 2 hours at 105 degrees C. of 65.0 percent by weight and a solids content measured for 1 hour at 150 degrees C. of 62.3 percent by weight.

What is claimed is:

1. An ungelled resin composition comprising a compound having at least one group containing a silicon atom said group selected from:

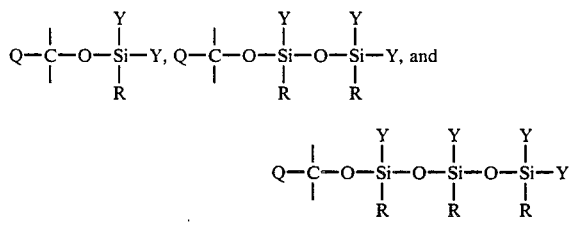

wherein

Q represents the residue from an organic polyol selected from the group consisting of (1) simple diols, triols and higher hydric alcohols, (2) polyester polyols, (3) polyether polyols, (4) amide containing polyols, (5) epoxy polyols and (6) polyhydric polyvinyl alcohols, and each R independently is selected from the group of moieties consisting of hydrogen, and a $C_1$–$C_{10}$ group joined to Si through an Si—C linkage, and Y represents an easily hydrolyzable group;

provided that said ungelled resin composition contains an amount of easily hydrolyzable Y moieties directly bonded to silicon atoms such that the ratio of the number of grams of said ungelled resin composition to equivalents of easily hydrolyzable Y moieties in said ungelled resin composition is in a range of from 40 to 667.

2. The ungelled resin composition of claim 1 which is curable to a tack free state in the presence of atmospheric moisture and a catalyst at a temperature of less than or equal to 121 degrees C. within 3 hours.

3. The ungelled resin composition of claim 1 which is curable to a tack free state in the presence of atmospheric moisture and a catalyst at a temperature of 24 degrees C. within 24 hours.

4. The ungelled resin composition claim 1 wherein at least a portion of the R moieties independently represent a $C_1$–$C_{10}$ group, joined to Si through an Si—C linkage, containing a primary amino group, a secondary amino group, a tertiary amino group, a polyamino group, a mercapto group, a urea group, a cyclic urea group, a urethane group, a 1,2-epoxy group, an ester group, an ether group, a thioether group, an amido group, an imidazolinyl group, a cyano group, a vinyl group, an allyl group or a halo atom.

5. The ungelled resin composition of claim 1 wherein each Y independently is selected from the group consisting of —$OR^1$,

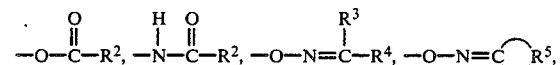

and the monohydroxy or cyclic $C_2$–$C_3$ residue of 1,2- or 1,3-glycol, wherein $R^1$ represents $C_1$–$C_3$ alkyl, $R^2$ independently represents H or $C_1$–$C_4$ alkyl, $R^3$ and $R^4$ independently represent H, $C_1$–$C_4$ alkyl, $C_6$–$C_8$ aryl or and $R^5$ represents $C_4$–$C_7$ alkylene.

6. The ungelled resin composition of claim 1 wherein at least one Y is a methoxy group and at least one R is a $C_1$–$C_3$ group.

7. The ungelled resin composition of claim 6 wherein R is selected from a methyl group and a vinyl group.

8. The ungelled resin composition of claim 1 which is a reaction product of said organic polyol and an organosilicon-containing material comprising at least 10 percent by weight of said organosilicon-containing material of a compound corresponding to the formula $R—Si(OR^6)_3$ wherein R independently represents hydrogen or a $C_1$–$C_{10}$ group joined to Si through an Si—C linkage, and $R^6$ independently represents a $C_1$–$C_3$ alkyl group.

9. The ungelled resin composition of claim 1 which is a reaction product of said organic polyol and an organosilicon-containing material comprising at least 10 percent by weight of said organosilicon-containing material of a compound corresponding to the formula

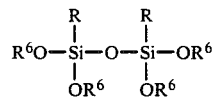

wherein

R independently represents hydrogen or a $C_1$–$C_{10}$ group joined to Si through an Si—C linkage, and $R^6$ independently represents a $C_1$–$C_3$ alkyl group.

10. The ungelled resin composition of claim 1 which is a reaction product of said organic polyol and an organosilicon-containing material comprising at least 10 percent by weight of said organosilicon-containing material of a compound corresponding to the formula

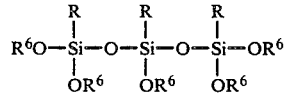

wherein

R independently represents hydrogen or a $C_1$–$C_{10}$ group joined to Si through an Si—C linkage, and $R^6$ independently represents a $C_1$–$C_3$ alkyl group 11. The ungelled resin composition of claim 1 which is a reaction product of said organic polyol and an organosilicon-containing material comprising a mixture containing at least 10 percent by weight of said organosilicon-containing material of a compound corresponding to the formula R—Si(OR$^6$)$_3$ and at least 10 percent by weight of said organosilicon-containing material of a compound corresponding to the formula

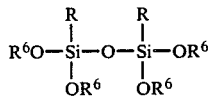

wherein
R independently represents hydrogen or a C$_1$-C$_{10}$ group joined to Si through an Si—C linkage, and
R$^6$ independently represents a C$_1$-C$_3$ alkyl group 12. The ungelled resin composition of claim 1 which is a reaction product of said organic polyol and a partial hydrolysis product of a compound corresponding to the formula R—Si(OR$^6$)$_3$
wherein
R independently represents hydrogen or a C$_1$-C$_{10}$ group joined to Si through an Si—C linkage, and
R$^6$ independently represents a C$_1$-C$_3$ alkyl group 13. The ungelled resin composition of claim 11 wherein at least one OR$^6$ is a methoxy group and at least one R is selected from methyl or vinyl.

14. The ungelled resin composition of claim 11 wherein said organic polyol has a hydroxyl equivalent weight of less than 3,000.

15. A nonaqueous composition comprising: an ungelled resin composition containing a compound having at least one group containing a silicon atom said group selected from:

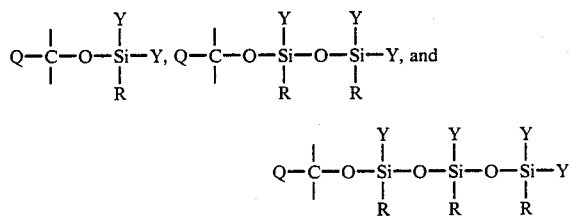

wherein
Q represents the residue from an organic polyol selected from the group consisting of (1) simple diols, triols and higher hydric alcohols, (2) polyester polyols, (3) polyether polyols, (4) amide-containing polyols, (5) epoxy polyols and (6) polyhydric polyvinyl alcohols, and each
R independently is selected from the group of moieties consisting of hydrogen, and a C$_1$-C$_{10}$ group joined to Si through an Si—C linkage, and
Y represents an easily hydrolyzable group;
provided that said ungelled resin composition contains an amount of easily hydrolyzable Y moieties directly bonded to silicon atoms such that the ratio of the number of grams of said ungelled resin composition to equivalents of easily hydrolyzable Y moieites in said ungelled resin composition is in a range of from 40 to 667.

16. The nonaqueous composition of claim 15 which is curable in the presence of atmospheric moisture and a catalyst at a temperature of less than or equal to 121 degrees C. within 3 hours.

17. The nonaqueous composition of claim 15 which is curable in the presence of atmospheric moisture and a catalyst at a temperature of 24 degrees C. within 24 hours.

18. The nonaqueous composition of claim 15 wherein at least a portion of the R moieties independently represent a C$_1$-C$_{10}$ group, joined to Si through an Si—C linkage, containing a primary amino group, a secondary amino group, a tertiary amino group, a polyamino group, a mercapto group, a urea group, a cyclic urea group, a urethane group, a 1,2-epoxy group, an ester group, an ether group, a thioether group, an amido group, an imidazolinyl group, a cyano group, an allyl group, a vinyl group, or a halo atom.

19. The nonaqueous composition of claim 15 wherein each easily hydrolyzable group Y of said ungelled resin composition independently is selected from the group consisting of —OR$^1$,

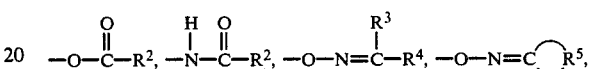

and the monohydroxy or cyclic C$_2$-C$_3$ residue of a 1,2- or 1,3-glycol,
wherein
R$^1$ represents C$_1$-C$_3$ alkyl,
R$^2$ represents H or C$_1$-C$_4$ alkyl,
R$^3$ and R$^4$ independently represent H, C$_1$-C$_4$ alkyl, C$_6$-C$_8$ aryl or and
R$^5$ represents C$_4$-C$_7$ alkylene.

20. The nonaqueous composition of claim 15 wherein at least one Y is a methoxy group and at least one R is methyl or vinyl.

21. The nonaqueous composition of claim 15 wherein said ungelled resin composition is a reaction product of said organic polyol and an organosilicon-containing material comprising a mixture containing at least 10 percent by weight of said organosilicon-containing material of a compound corresponding to the formula R—Si(OR$^6$)$_3$ and at least 10 percent by weight of said organosilicon-containing material of a compound corresponding to the formula

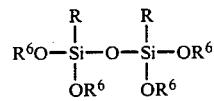

wherein
R independently represents hydrogen or a C$_1$-C$_{10}$ group joined to Si through an Si—C linkage, and
R$^6$ independently represents a C$_1$-C$_3$ alkyl group 22. A substrate having thereon a cured film comprising the nonaqueous composition of claim 15.

23. A substrate having thereon a cured film comprising the nonaqueous composition of claim 16.

24. A method of preparing an ungelled resin composition, curable in the presence of atmospheric moisture and a catalyst at a temperature of less than or equal to 121 degrees C., by reacting components comprising:
(A) an organic polyol selected from the group consisting of (1) simple diols, triols and higher hydric alcohols, (2) polyester polyols, (3) polyether polyols, (4) amide containing polyols, (5) epoxy polyols and (5) polyhydric polyvinyl alcohols; and
(B) an organosilicon-containing material comprising at least 10 percent by weight of said organosilicon-containing material of a compound corresponding to the formula R—Si(OR$^6$)$_3$ wherein R independently represents hydrogen or a C$_1$-C$_{10}$ group joined to Si through an Si—C linkage, and R$^6$ independently represents a C$_1$-C$_3$ alkyl group; whereby said ungelled resin composition contains an amount of easily hydrolyzable Y moieties directly bonded to silicon atoms such that the ratio of the number of grams of said ungelled resin composition to equivalents of easily hydrolyzable Y moieties in said ungelled resin composition is in a range of from 40 to 667.

25. The method of claim 24 wherein said organosilicon-containing material additionally comprises at least 10 percent by weight of said organosilicon-containing material of a compound corresponding to the formula

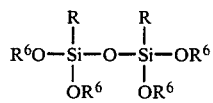

wherein

R independently represents hydrogen or a C$_1$-C$_{10}$ group joined to Si through an Si—C linkage, and R$^6$ independently represents a C$_1$-C$_3$ alkyl group 26. The method of claim 24 wherein said organosilicon-containing material is a partial hydrolysis product of a compound corresponding to the formula R—Si(OR$^6$)$_3$ wherein R independently represents hydrogen or a C$_1$-C$_{10}$ group joined to Si through an Si—C linkage, and R$^6$ independently represents a C$_1$-C$_3$ alkyl group 27. The nonaqueous composition of claim 15 additionally comprising an organic polyol.

28. The nonaqueous composition of claim 27 wherein said organic polyol is selected from the group consisting of: simple diols, triols and higher hydric alcohols; acrylic polyols; polyurethane polyols; polyester polyols; polyether polyols; amide-containing polyols; polyhydroxyl-functional epoxy resins; polyhydric polyvinyl alcohols; and mixtures thereof.

* * * * *